(12) United States Patent
Nagashima

(10) Patent No.: US 7,099,025 B2
(45) Date of Patent: *Aug. 29, 2006

(54) PRINTING SYSTEM, PRINTING CONTROL METHOD AND APPARATUS PRINTING DATA IN ACCORDANCE WITH UPDATED CONDITION INFORMATION

(75) Inventor: Takeyuki Nagashima, Tokyo (JP)

(73) Assignee: Canon Kabushiki Kaisha, Tokyo (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/033,585

(22) Filed: Mar. 3, 1998

(65) Prior Publication Data

US 2002/0118385 A1 Aug. 29, 2002

(30) Foreign Application Priority Data

Mar. 5, 1997 (JP) .............................................. 9-050287

(51) Int. Cl.
G06F 3/12 (2006.01)

(52) U.S. Cl. .................... 358/1.15; 358/2.99; 358/3.01; 358/518; 358/519; 358/1.9

(58) Field of Classification Search ................. 395/114, 395/106, 113, 115; 358/517, 521, 1.1–1.9, 358/1.11–1.18, 2.1, 2.99, 3.01, 3.02, 3.03, 358/3.05, 3.06, 3.09, 3.1, 3.21–3.24, 3.26, 358/3.27, 504, 518, 519, 534, 406; 382/255; 399/38, 44, 72, 97
See application file for complete search history.

(56) References Cited

U.S. PATENT DOCUMENTS

| 4,381,553 | A | * | 4/1983 | Ferguson | 364/900 |
|---|---|---|---|---|---|
| 5,048,078 | A | * | 9/1991 | Satomi et al. | 379/102.02 |
| 5,220,674 | A | * | 6/1993 | Morgan et al. | 395/800 |
| 5,305,057 | A | | 4/1994 | Hattori et al. | 355/203 |
| 5,333,069 | A | * | 7/1994 | Spence | 358/517 |
| 5,471,313 | A | * | 11/1995 | Thieret et al. | 358/296 |
| 5,495,542 | A | * | 2/1996 | Shimomura et al. | 382/254 |
| 5,559,933 | A | | 9/1996 | Boswell | 395/114 |
| 5,566,372 | A | * | 10/1996 | Ikeda et al. | 358/458 |
| 5,572,632 | A | * | 11/1996 | Laumeyer et al. | 358/1.17 |
| 5,579,090 | A | * | 11/1996 | Sasanuma et al. | 358/521 |
| 5,611,046 | A | * | 3/1997 | Russell et al. | 395/115 |
| 5,712,930 | A | * | 1/1998 | Watanabe | 382/270 |
| 5,739,841 | A | * | 4/1998 | Ng et al. | 347/240 |
| 5,768,483 | A | * | 6/1998 | Maniwa et al. | 395/114 |
| 5,818,501 | A | * | 10/1998 | Ng et al. | 347/240 |
| 5,862,326 | A | * | 1/1999 | Bapat | 395/200.33 |
| 5,872,895 | A | * | 2/1999 | Zandee et al. | 358/1.9 |
| 5,923,834 | A | * | 7/1999 | Thieret et al. | 395/183.01 |
| 5,933,676 | A | * | 8/1999 | Ohno | 358/504 |

FOREIGN PATENT DOCUMENTS

| EP | 0 603 833 A2 | 6/1994 |
|---|---|---|
| JP | 5-11552 | 1/1993 |
| JP | 6-320796 | 11/1994 |

* cited by examiner

Primary Examiner—King Y. Poon
(74) Attorney, Agent, or Firm—Fitzpatrick, Cella, Harper & Scinto

(57) ABSTRACT

When an engine unit of a printing apparatus issues a calibration request, a controller unit of the printing apparatus stores correction data in a storage unit. Upon printing, a data controller checks if the correction data is stored in the storage unit. If the correction data is stored, the data controller forms a correction table on the basis of the correction data. The data controller corrects print data in accordance with the correction table, and generates binary image data. The data controller then sends the binary image data to the printing apparatus to make the apparatus print.

20 Claims, 8 Drawing Sheets

FIG. 9

| PRINTER NAME | CORRECTION DATA | CORRECTION DATA GENERATION TIME | STATUS INFORMATION |
|---|---|---|---|
| PRINTER A | ✕1  ✕2  ✕3  ✕4 | 1997,1,10 9:00 | NUMBER OF PRINTS : ○ |
| PRINTER B | ✕10  ✕11  ✕12  ✕13 | 1997,1,10 10:00 | NUMBER OF PRINTS : □ |

FIG. 10

PRINTER INFORMATION

| PRINTER NAME | CORRECTION DATA GENERATION TIME | STATUS INFORMATION | CALIBRATION REQUEST |
|---|---|---|---|
| PRINTER A | 1997,1,10 9:00 | REMAINING NUMBER OF PRINTS α | □ |
| PRINTER B | 1997,1,10 10:00 | REMAINING NUMBER OF PRINTS β | □ |

OK   CANCEL

PRINTING SYSTEM, PRINTING CONTROL METHOD AND APPARATUS PRINTING DATA IN ACCORDANCE WITH UPDATED CONDITION INFORMATION

BACKGROUND OF THE INVENTION

1. Field of the Invention

The present invention relates to a printing control method and apparatus in a printing system and, more particularly, to a printing system which is constituted by a host computer and printing apparatus connected via two-way communications, and in which the host computer corrects data in accordance with a calibration request coming from the printing apparatus, and a printing control method and apparatus.

2. Related Background Art

The output images of a printing apparatus change depending on changes in environmental conditions such as temperature, humidity, and the like. If the printing apparatus is of an electrophotographic type, visible images formed change or deteriorate due to deterioration or the like of expendables such as a drum, toner cartridge, and the like. The conventional printing apparatus executes calibration for correcting such changes or deteriorations of images. In the calibration, a controller unit generates correction data in response to a calibration request from an engine unit, and corrects image data.

However, such calibration done in a printer can execute only limited kinds of corrections. For example, when the densities of the respective colors are to be corrected, a binary printer corrects data in the process of generating binary image data to be output. More specifically, in order to match the density data of an original image to be output with those recorded by the current printer in correspondence with the original density data, the controller unit generates binary image data to be input to the engine unit on the basis of the original image in consideration of the density differences.

For this reason, when the host computer binarizes data and transmits binary image data to the printing apparatus, the controller cannot detect the density differences between the original image and output image, and calibration in the printer cannot sufficiently correct data.

SUMMARY OF THE INVENTION

The present invention has been made in consideration of the above prior art, and has as its object to provide a printing system, and a printing control method and apparatus, which can implement calibration that can form a high-quality output image in response to a calibration request from a printer.

In order to achieve the above object, the present invention comprises the following arrangement. That is, there is provided a printing control method for a printing control apparatus which is connected, via a two-way path, to a printing apparatus that issues correction data together with a correction request in accordance with a state thereof, and which makes the printing apparatus print, comprising:

the acquisition step of acquiring correction data in accordance with the correction request from the printing apparatus; and the formation step of forming a correction table on the basis of the correction data.

There is also provided a printing control apparatus which is connected, via a two-way path, to a printing apparatus that issues correction data together with a correction request in accordance with a state thereof, and which makes the printing apparatus print, comprising:

acquisition means for acquiring correction data in accordance with the correction request from the printing apparatus; and formation means for forming a correction table on the basis of the correction data.

There is also provided a printing system comprising:

a printing apparatus for outputting correction data together with a correction request in accordance with a state thereof; and a printing control apparatus which comprises acquisition means for acquiring correction data in accordance with the correction request from the printing apparatus and formation means for forming a correction table on the basis of the correction data, the printing system being constituted by connecting the printing apparatus and the printing control apparatus via a two-way communication.

There is also provided a storage medium that stores a printing control program for an apparatus which is connected, via a two-way path, to a printing apparatus that issues correction data together with a correction request in accordance with a state thereof, and which makes the printing apparatus print, comprising:

(1) the new correction data presence checking step of checking if new correction data for calibration is present;

(2) the new correction data acquisition step of acquiring correction data for calibration if it is determined in the new correction data presence checking step that the new correction data for calibration is present;

(3) the correction data comparison flag setting step of setting a correction data comparison flag indicating whether or not the new correction data is compared with old correction data used in the last calibration to be "ON" when the new correction data is acquired, and to be "OFF" if it is determined in the new correction data presence checking step that the new correction data for calibration is not present;

(4) the old correction data presence checking step of checking if correction data used in the last calibration is present;

(5) the old correction data acquisition step of acquiring old correction data if it is determined in the old correction data presence checking step that the correction data used in the last calibration is present;

(6) the new and old correction data comparison determination step of comparing contents of the new and old correction data if the correction data comparison flag is set to be "ON" in the correction data comparison flag setting step;

(7) the new correction table formation step of forming a new correction table for calibration if it is determined in the new and old correction data comparison determination step that the new and old correction data are different from each other;

(8) the new correction data group registration step of registering the new correction data and new correction table if the new correction table is formed in the new correction table formation step;

(9) the old correction table presence checking step of checking whether or not a correction table used in the last calibration is present, if it is determined that the new correction data is equal to the old correction data when it is determined in the old correction data presence checking step that the old correction data is not present and when it is determined in the correction data comparison flag setting step that the flag is set not to compare the new and old correction data, and if the new correction table cannot be formed in the new correction table formation step;

(10) the old correction table acquisition step of acquiring an old correction table if it is determined in the old correction table presence checking step that the correction table used in the last calibration is present;

(11) the calibration execution checking flag setting step of setting a calibration execution checking flag, indicating whether or not calibration is executed, to be "ON" if a new correction data group is registered in the new correction data group registration step or if the old correction table is acquired in the old correction table acquisition step, and to be "OFF" if it is determined in the old correction table presence checking step that the old correction table is not present; and

(12) the calibration execution step of calibrating print data using the formed new correction table or the acquired old correction table if the flag is set to be "ON" in the calibration execution checking flag setting step.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 is a table storing correction data and status information for each printer.

FIG. 10 is a status list of the printers connected to the network system, which is displayed on the host computer.

DETAILED DESCRIPTION OF THE PREFERRED EMBODIMENTS

The preferred embodiments of the present invention will be described hereinafter with reference to the accompanying drawings.

<Arrangement of Printing System>

Figure 2:
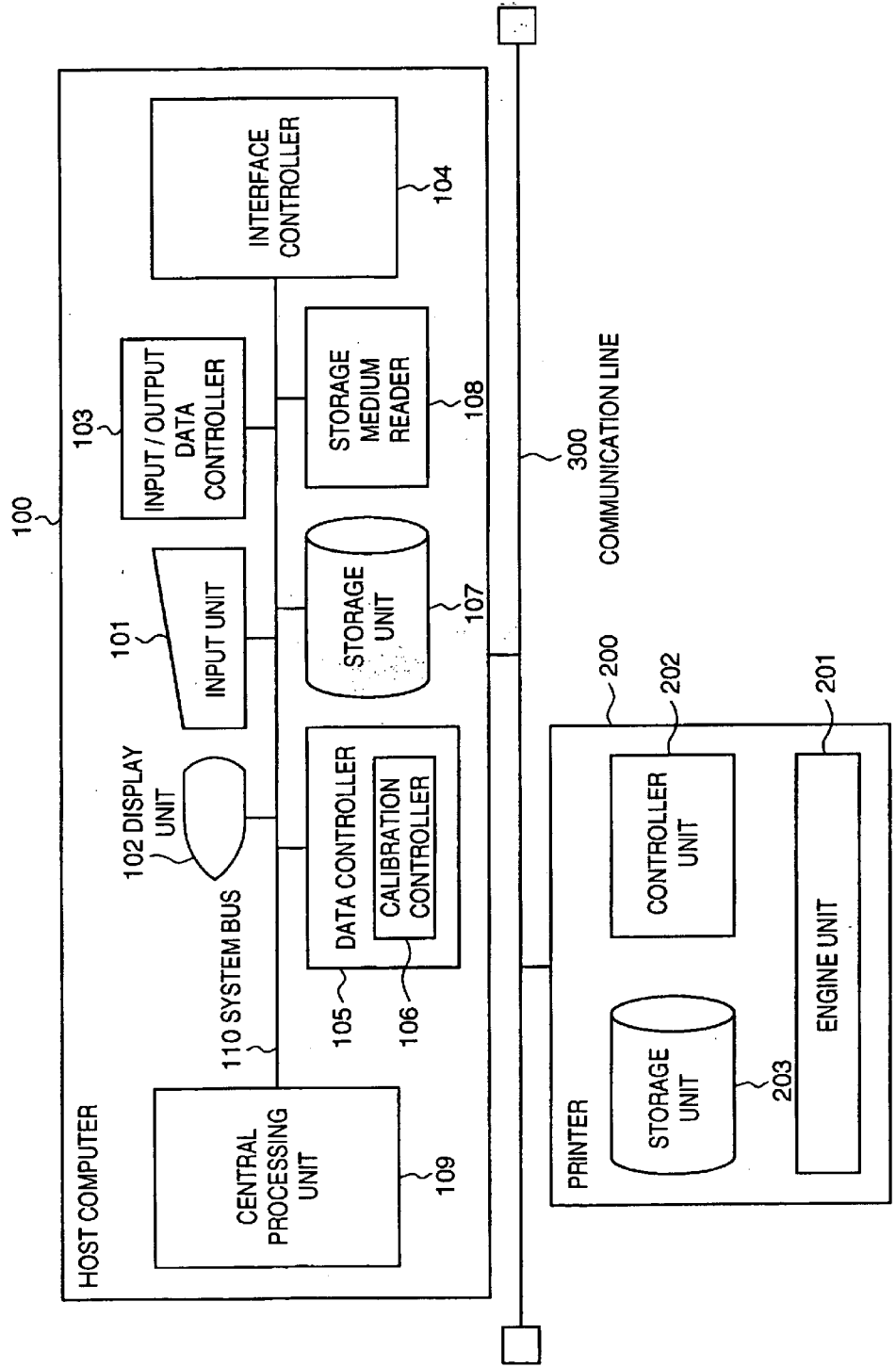
FIG. 2 is a block diagram of a printing system according to an embodiment of the present invention.

FIG. 2 is a block diagram of a printing system to which the data correction control method according to an embodiment of present invention is applied, and which is constituted by a host computer and printer connected via a two-way communication line.

This printing system comprises a host computer 100, a printer 200, and a communication line 300 for connecting them. The host computer 100 comprises an input unit 101, display unit 102, input/output data controller 103, interface controller 104, print data controller 105, calibration controller 106, storage unit 107, storage medium reader 108, central processing unit (CPU) 109 for controlling the overall host computer 100, and system bus 110 for connecting these components.

The printer 200 comprises an engine unit 201, controller unit 202, and storage unit 203 controlled by the controller unit 202.

The communication line 300 may comprise a normal LAN or a two-way serial interface such as IEEE1394 or USB.

The input unit 101 comprises a pointing device such as a keyboard, mouse, and the like. The display unit 102 comprises a CRT display, liquid crystal display, or the like. The print data controller 105 is a so-called printer driver and, more particularly, a raster driver for generating binary image data on the basis of print data. Note that the printer driver is a program which is located between an operating system always running on the host computer 100, and the printer 200, so as to process print data created by an application program or the like in accordance with the printer and to control the printer 200, and is stored in the storage unit 107 or a medium read by the storage medium reader 108. The storage medium reader 108 can read programs such as a printer driver and the like, and image data and the like recorded on a recording medium such as an FD (floppy disk), CD-ROM, ROM, magnetic tape, and the like.

The engine unit 201 has a function of supplying, especially, a calibration request to the controller unit in addition to normal engine processing such as printout processing. The controller unit 202 has a function of controlling the storage unit 203 that can acquire and store correction data upon reception of, especially, the calibration request from the engine unit 201, in addition to the normal controller processing.

Figure 6:
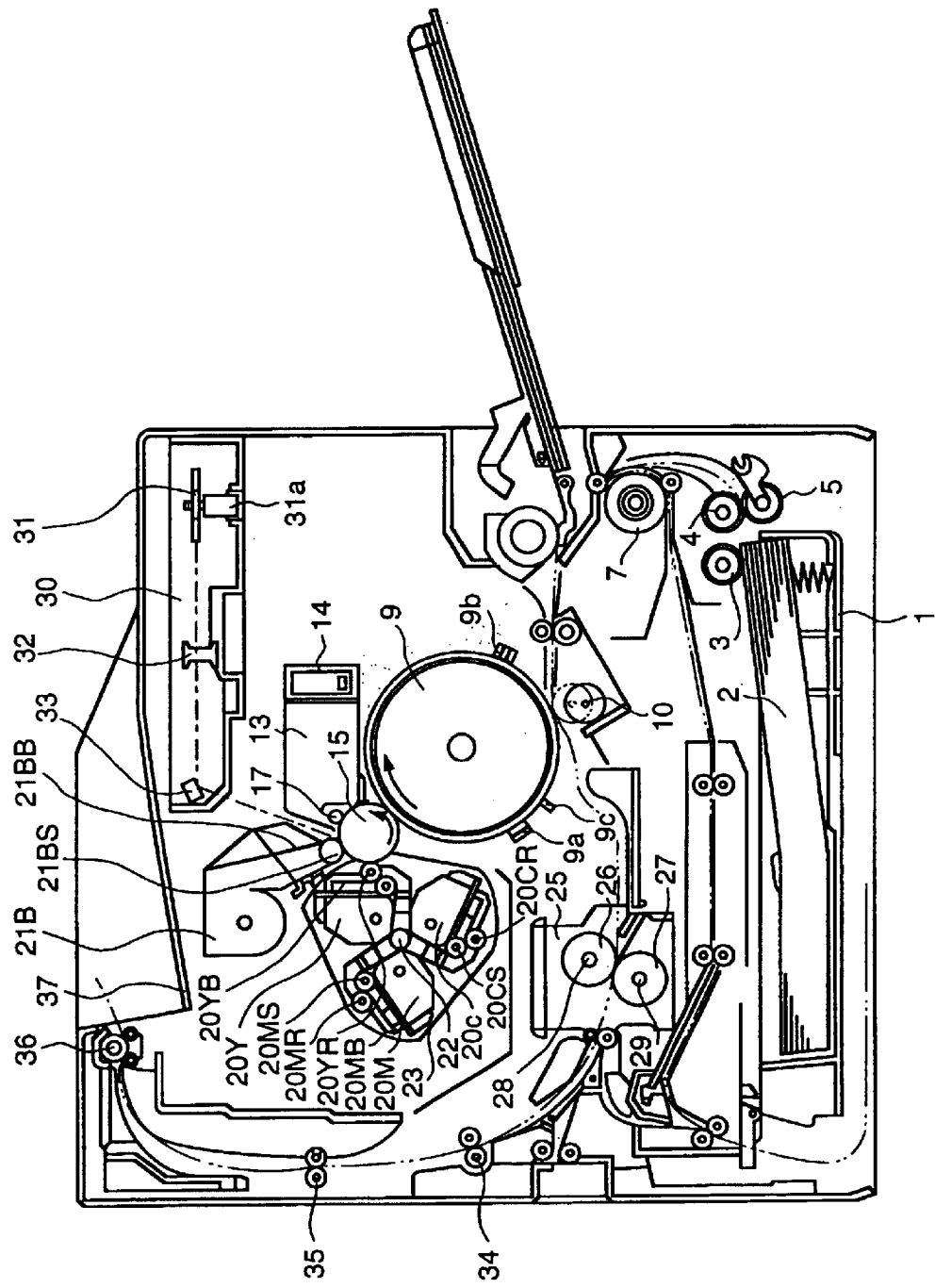
FIG. 6 is a sectional view of a color laser beam printer.

Note that the engine unit 201 issues a calibration request to the controller unit 202 when each of various status parameters indicating the engine states has reached a predetermined value. The status parameters include the use frequency after a photosensitive drum has been exchanged, the temperature and humidity inside the printer, the temperature of a fixing unit for melting toner, and the like in case of, e.g., the electrophotographic engine. On the other hand, in an ink-jet type engine that heats ink by a heater to cause film boiling, and ejects ink by that pressure, the ink temperature, the temperature of the heater for heating the ink, and the like are used as status parameters. The engine unit 201 monitors such parameters using sensors, counters, and the like. As shown in FIG. 6, the printer may comprise a density sensor for directly detecting the toner density on a drum, and the directly detected image density may be used in calibration.

<Arrangement of Printer>

FIG. 6 is a sectional view of a color printer as an example of the printer 200. In this printer, a laser beam is modulated by each image data in units of colors obtained based on print data received from the host computer 101, and is reflected by a rotary polygonal mirror 31 to scan the surface of a photosensitive drum 15, thereby forming an electrostatic latent image. The electrostatic latent image is developed by toner to obtain a visible image. Such visible images for all the colors are multiple-transferred onto an intermediate transfer body 9 to form a color visible image. The color visible image is transferred and fixed onto a transfer medium 2. An image forming unit which performs the above-mentioned control comprises a drum unit 13 having the photosensitive drum 15, a primary charger unit having a contact charger roller 17, a cleaning unit, a developing unit, the intermediate transfer body 9, a paper feed unit including a paper feed cassette 1 and various rollers 3, 4, 5, and 7, a transfer unit including a transfer roller 10, and a fixing unit 25.

The drum unit 13 integrates the photosensitive drum (photosensitive body) 15 and a cleaner container 14 which also serves as a holder of the photosensitive drum 15 and has a cleaning function. The drum unit 13 is detachably supported by a printer body, and can be easily exchanged in correspondence with the service life of the photosensitive drum 15. The photosensitive drum 15 is prepared by forming an organic photoconductive layer on the outer surface of an aluminum cylinder, and is rotatably supported by the cleaner container 14. The photosensitive drum 15 is rotated by a driving force transmitted from a drive motor (not shown). The drive motor rotates the photosensitive drum 15 counterclockwise in accordance with image formation. On the surface of the photosensitive drum 15, an electrostatic latent image is formed by selectively exposing the surface of the photosensitive drum 15 with a laser beam coming from a scanner unit 30. In the scanner unit 30, a modulated laser beam is reflected by a polygonal mirror which is rotated by a motor 31a in synchronism with the horizontal synchronization signal of an image signal, and the reflected laser beam is irradiated onto the photosensitive drum via a lens 32 and reflection mirror 33.

The developing unit comprises three color developers 20Y, 20M, and 20C for obtaining yellow (Y), magenta (M), and cyan (C) images by development, and a single black developer 21B for obtaining a black (B) image by development, so as to convert the electrostatic latent image into a visible image. The color developers 20Y, 20M, and 20C, and black developer 21B respectively have sleeves 20YS, 20MS, 20CS, and 21BS, and supply blades 20YB, 20MB, 20CB, and 21BB which are in press-contact with the outer surfaces of these sleeves 20YS, 20MS, 20CS, and 21BS. The three color developers 20Y, 20M, and 20C have supply rollers 20YR, 20MR, and 20CR, respectively.

The black developer 21B is detachably attached to the printer body, and the color developers 20Y, 20M, and 20C are respectively detachably attached to a development rotary member 23 that rotates about a rotation shaft 22.

The sleeve 21BS of the black developer 21B is set to have a small gap of about 300 μm from the photosensitive drum 15. The black developer 21B feeds toner by its internal feed member, and gives a charge to toner by friboelectrification so as to supply toner onto the outer surface of the sleeve 21BS, which rotates clockwise, by the supply blade 21BB. By applying a developing bias to the sleeve 21BS, an electrostatic latent image on the photosensitive drum 15 is developed by black toner to form a visible image thereon.

The three color developers 20Y, 20M, and 20C are rotated upon rotation of the development rotary member 23 in image formation, and a predetermined one of the sleeves 20YS, 20MS, and 20CS faces the photosensitive drum 15 to have a small gap of about 300 μm from the drum 15. A predetermined one of the color developers 20Y, 20M, and 20C stops at the developing position facing the photosensitive drum 15, and forms a visible image by the corresponding color toner on the photosensitive drum 15.

In color image formation, a development rotary member 23 rotates per revolution of the intermediate transfer body 9, and developing processes are done in the order of the yellow developer 20Y, magenta developer 20M, cyan developer 20C, and black developer 20B. The intermediate transfer body 9 makes four revolutions to sequentially form visible images by the yellow, magenta, cyan, and black toners, and as a consequence, a full-color visible image is formed on the intermediate transfer body 9.

The intermediate transfer body 9 contacts the photosensitive drum 15, and is rotated upon rotation of the photosensitive drum 15. In color image formation, the intermediate transfer body 9 is rotated clockwise, and proceeds to multiple-transfers of four visible images from the photosensitive drum 15. In image formation, the intermediate transfer body 9 conveys the transfer medium 2 together with the transfer roller 10 while clamping it therebetween, thereby simultaneously multiple-transferring the color visible image on the intermediate transfer body 9 into the transfer medium 2. A TOP sensor 9a and RS sensor 9b for detecting the positions associated with the direction of rotation of the intermediate transfer body 9, and a density sensor 9c for detecting the density of a toner image transferred onto the intermediate transfer body are disposed around the intermediate transfer body.

The transfer roller 10 comprises a transfer charger which is attached to approach or be separate from the photosensitive drum 15, and is formed by winding a medium-resistance foamed elastic member around a metal shaft.

The transfer roller 10 is separated downward from the intermediate transfer body 9 so as not to disturb a color visible image while a color visible image is multiple-transferred onto the intermediate transfer body 9, as indicated by the solid line in FIG. 6. After the four color visible images are formed on the intermediate transfer body 9, the transfer roller 10 is moved upward by a cam member (not shown), as indicated by the dotted line in FIG. 6, in synchronism with the transfer timing of these color visible images onto the transfer medium 2. In this way, the transfer roller 10 is pressed against the intermediate transfer body 9 via the transfer medium 2 at a predetermined pressure, and a bias voltage is applied, thus transferring the color visible image on the intermediate transfer body 9 onto the transfer medium 2.

The fixing unit 25 fixes the transferred color visible image while conveying the transfer medium 2, and comprises a fixing roller 26 for heating the transfer medium 2, and a press roller 27 for pressing the transfer medium 2 against the fixing roller 26. The fixing roller 26 and press roller 27 are respectively formed into hollow shapes, and respectively incorporate heaters 28 and 29. More specifically, the transfer medium 2 that holds the color visible image is conveyed by the fixing roller 26 and press roller 27, and receives heat and pressure to fix the toner image on its surface.

After the visible image is fixed, the transfer medium 2 is discharged onto a discharge unit 37 by discharge rollers 34, 35, and 36, thus ending the image formation.

A cleaning means cleans the residual toner on the photosensitive drum 15 and intermediate transfer body 9. Waste toner after the visible image formed by toner on the photosensitive drum 15 is transferred onto the intermediate transfer body 9, or waste toner after the four color visible images formed on the intermediate transfer body 9 are transferred onto the transfer medium 2 is stored in the cleaner container 14.

<Calibration Control>

Figure 1:
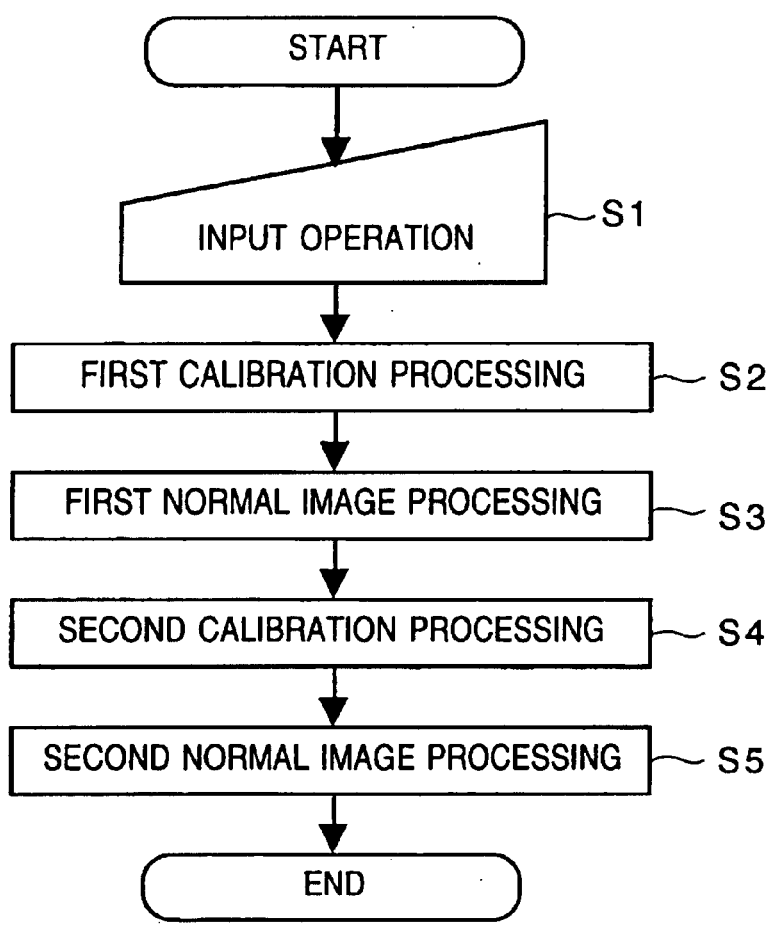
FIG. 1 is a flow chart showing the flow of the data correction control principle according to the present invention.

FIG. 1 shows an example of the sequence of the data correction control method (implemented by the calibration controller 106 in FIG. 2) in this embodiment. This sequence includes the input operation step S1 of printing with respect to, e.g., an application program, the first normal calibration processing step S2 of acquiring correction data from the printer, the first normal image processing step S3 of performing RGB→YMCK conversion, the second calibration processing step S4 of performing multi-valued gamma correction for the YMCK-converted data, and the normal second image processing step S5 of binarizing and outputting the corrected data.

Figure 3:
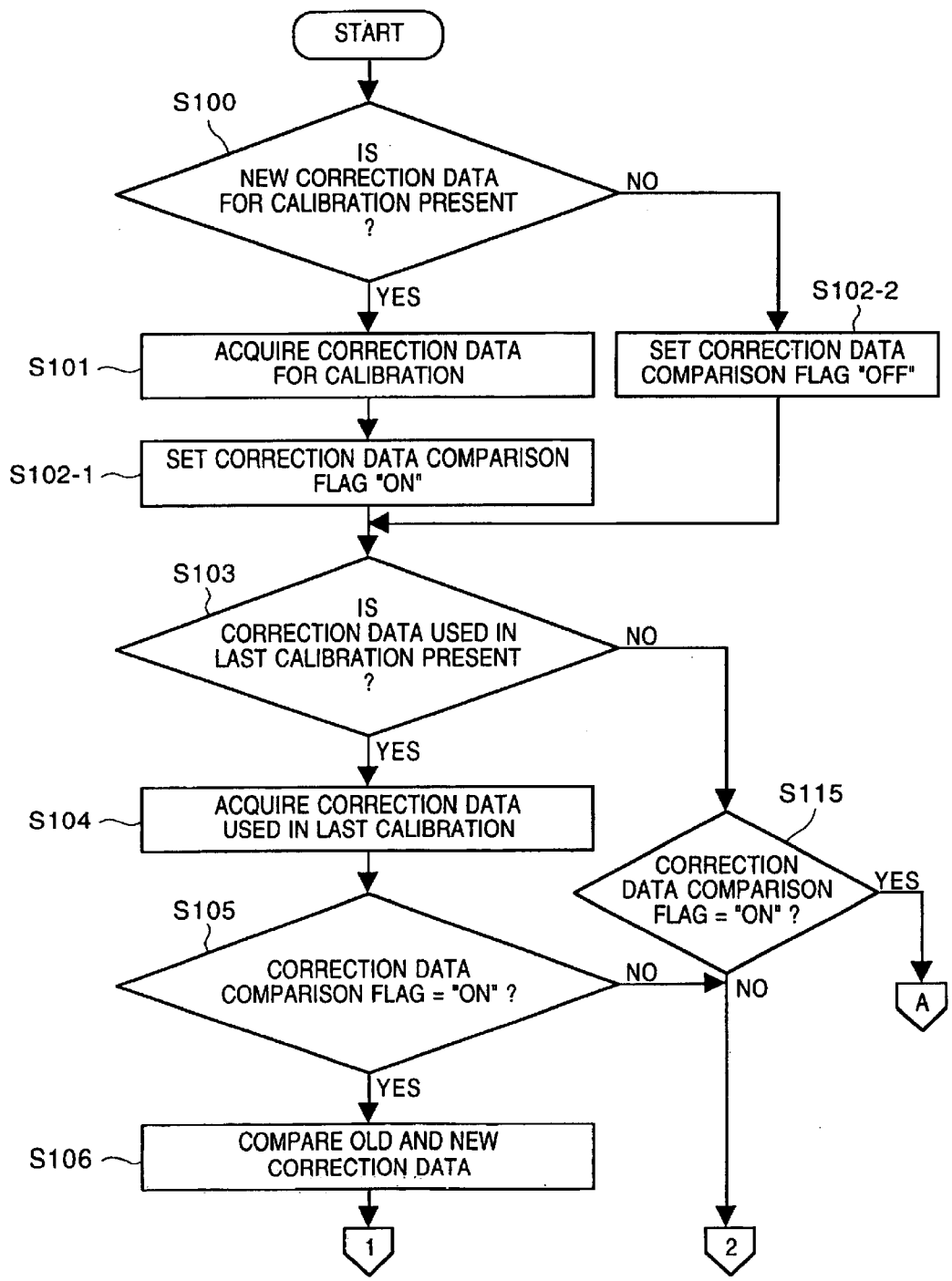
FIG. 3 is a flow chart of the calibration control in the embodiment.
Figure 4:
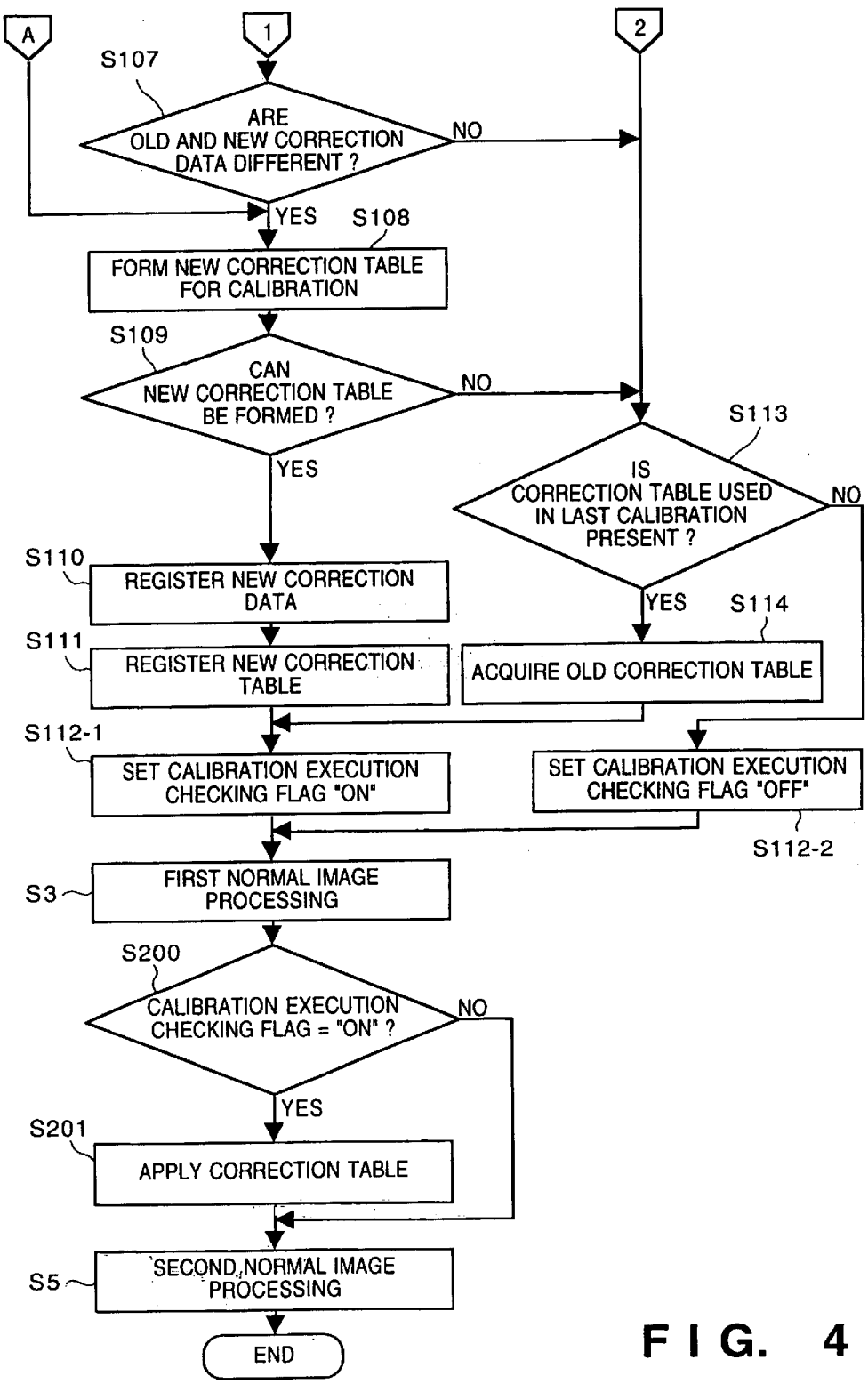
FIG. 4 is a flow chart of the calibration control in the embodiment.

FIGS. 3 and 4 show the method shown in FIG. 1 in more detail. The first calibration processing step S2 in FIG. 3 includes the new correct data presence checking step S100, new correction data acquisition step S101, correction data comparison flag setting steps S102-1 and S102-2, old correction data presence checking step S103, old correction data acquisition step S104, correction data comparison flag checking step S105, new & old correction data comparison processing step S106 (FIG. 3), new & old correction data comparison step S107, new correction table formation step S108, new correction table formation checking step S109, new correction data registration step S110, new correction table registration step S111, calibration execution checking flag setting steps S112-1 and S112-2, old correction table presence checking step S113, and old correction table acquisition step S114 (FIG. 4). The second calibration processing step S4 shown in FIG. 1 includes the calibration execution checking flag checking step S200, and calibration execution (apply correction table) step S201, as shown in FIG. 4.

<Details of Control Sequence>

The operation of the data controllers of the printing system of this embodiment will be explained below with reference to FIGS. 1, 2, 3, and 4.

When the operator performs input operations for printing using the input unit 101 and display unit 102 with respect to an application program at the host computer 100 (step S1), the sequence shown in FIGS. 3 and 4 starts. This sequence may be done when the power switch of the printer 200 is turned on. For example, the sequence need only be done for each power ON with respect to slow changes like aging of drums or toner.

The data controller 105 checks if correction data for calibration (to be referred to as new correction data hereinafter) is present in the storage unit 203 of the printer 200 (step S100). This new correction data is stored in the storage unit 203 by the controller unit 202 in response to a calibration request which is issued by the engine unit 201 in the printer 200 to the controller unit 202.

Figure 5:
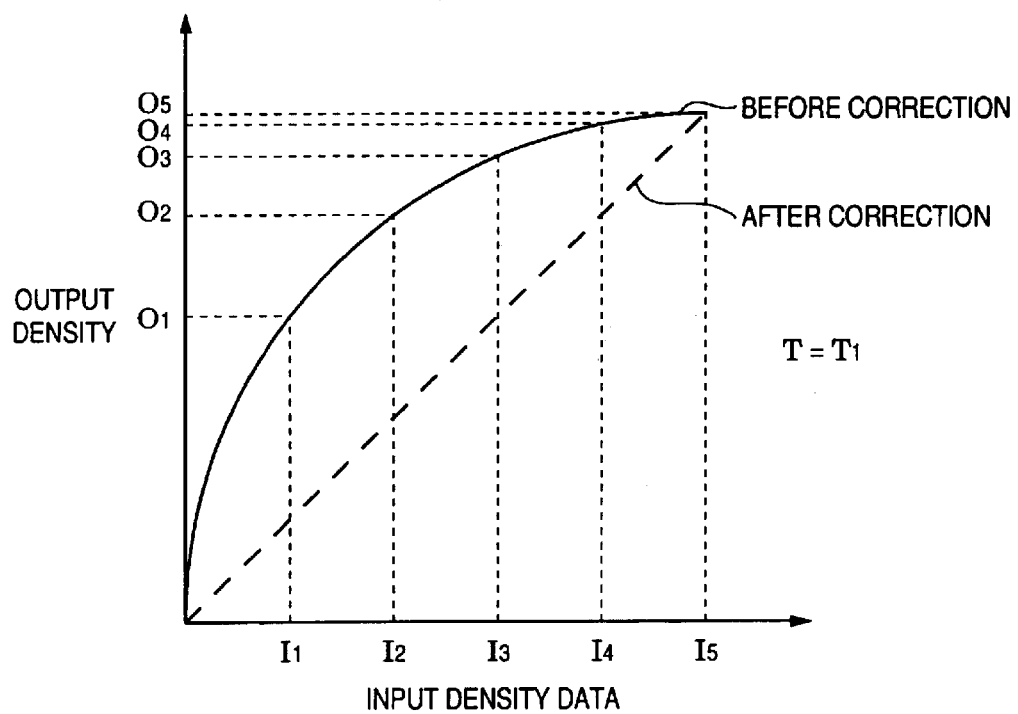
FIG. 5 is a graph for explaining density correction as an example of calibration.

An example of the correction data will be explained below with reference to FIG. 5. As described above, the engine unit 201 issues a calibration request when one of status parameters has reached a predetermined threshold value. The solid curve in FIG. 5 represents the relationship between the input density and output density which is recorded actually, when the toner fixing temperature T as one of status parameters has reached a threshold value T1 at which the calibration request is issued. Ideally, the input density preferably matches the output density, as indicated by the dotted line. However, when the fixing temperature T=T1, the output density deviates from the ideal line, as shown in FIG. 5. In this case, for example, output densities O1 to O5 corresponding to predetermined input densities I1 to I5 are stored as correction data in the storage unit 203. The relationship between the input and output densities is experimentally obtained in advance with respect to changes in fixing temperature, and is stored in the storage unit 203 or a ROM (not shown). Hence, the correction data is given as a function of the temperature T. In this way, the correspondence between the input and output densities with respect to each status parameter is stored as correction data in the storage unit 203. Alternatively, in response to a calibration request, the relationship between the input image data and the density (detected by the density sensor 9) of a toner image formed in correspondence with that image data may be obtained, and may be stored in the storage unit 203. Correction data for status parameters other than the fixing temperature are similarly given in units of predetermined threshold values.

If it is determined in step S100 if new correction data is stored, the new correction data is acquired from the storage unit 203 (step S101). Subsequently, a correction data comparison flag is set "ON" indicating the presence of the new correction data (step S102-1). On the other hand, if it is determined in step S100 that new correction data is not present, the correction data comparison flag is set "OFF" in step S102-2.

Note that the data controller 105 may read out new correction data in advance using a communication utility of the operating system and may store it in the storage unit 107 or the like in place of directly accessing the storage unit 203 via the two-way interface. In this case, upon checking in step S100, the data controller 105 need not access the storage unit 203.

When the new correction data is present, the data controller 105 looks up the storage unit 107 to check if correction data used in the last calibration (to be referred to as old correction data hereinafter) is present (step S103). If such data is stored, the old correction data is acquired from the storage unit 107 (step S104). Subsequently, the value of the correction data comparison flag is checked (step S105). If the flag is "ON", the new correction data acquired in step S101 is compared with the old correction data acquired in step S104 (step S106). The comparison result is tested (step S107), and if it is determined that the two data are different from each other, a new correction table for calibration (to be referred to as a new correction table hereinafter) is formed (step S108).

The new correction table is formed on the basis of the new correction data acquired in step S101. Note that the correction table is used for correcting the relationship between the input and output densities before correction indicated by the solid curve to an ideal relationship indicated by the dotted curve, in the example shown in FIG. 5. In step S108, a correction table for performing density conversion of an output binary image to revert the relationship between the input and output densities indicated by the solid curve in FIG. 5 to an original one indicated by the dotted curve, is formed on the basis of the new correction data that represents the relationship between the input and output densities indicated by the solid curve in FIG. 5. Note that only one density is considered in the above description, but densities in units of colors must be considered in case of a color image. In a color image, if the balance of color densities has changed, color tones and color purities also change. In other words, the correction of densities in units of colors includes that of color tones and color purities.

After the new correction table is formed, it is then checked if formation of the new correction table is successful (step S109). If the new correction table can be formed, the acquired new correction data is registered (step S110), and the formed new correction table is registered (step S111). After the registration, a calibration execution checking flag is set "ON" (step S112-1).

On the other hand, if it is determined in step S103 that old correction data is not present, the correction data comparison flag is tested in step S115. If the flag is "ON", a new correction table is formed. On the other hand, if it is determined in step S115 that the flag is "OFF", or if it is determined in step S105 that the correction data comparison flag is "OFF", or if it is determined in step S109 that formation of the new correction table fails, it is checked if a correction table used in the last calibration is present in the storage unit 107 (step S113). If it is determined in step S113 that such table is present, an old correction table is acquired (step S114), and a calibration execution checking flag is set "ON" in step S112-1.

On the other hand, if it is determined in step S113 that such table is not present, the calibration execution checking flag is set "OFF" (step S112-2).

Upon completion of the formation of the correction table, normal image processing is done for print data (step S3). Note that the normal image processing is divided into two processing operations in step S3 and S5 in the data controller 105. In the first normal image processing (step S3), the print data controller 105 converts print data from RGB (8-bit) data into CMYK (8-bit) data. In the second normal image processing (step S5), the print data controller 105 binarizes the CMYK (8-bit) data, and outputs them to the printer.

The calibration execution checking flag is checked (step S200). If the flag is "ON", calibration is executed using the new correction table formed in step S108 above or the old correction table acquired in step S114 (step S201). With this processing, multi-valued gamma correction is performed for the CMYK data (8-bit) generated in step S3.

Finally, the normal image processing (step S5) is done for the print data, as described above.

Note that the correction shown in FIG. 5 is done as a sole correction process in the above-mentioned sequence. However, the number of processes increases by one. To prevent this, as a table used in RGB→CMYK conversion in step S3, a table that includes the correction table may be used to simultaneously perform RGB→CMYK conversion and correction. For this purpose, in step S108, a table for RGB→CMYK conversion is formed on the basis of the correction data. Normally, RGB→CMYK conversion is attained by matrix calculations, and density correction can also be attained by matrix calculations. Hence, it is easy to form a conversion table obtained by synthesizing both the functions. In place of synthesis, a corresponding conversion table may be obtained using the correction data as a key.

With the above-mentioned sequence, the data controller in the host forms a correction table in response to a calibration request from the printer engine unit. Since this correction table is applied to image data in the process of forming a binary image in the data controller in the host, even when the host sends binary image data to the printer to make the printer print, the image densities and colors can be corrected. For this reason, a high-quality image can be printed out regardless of the state of the printer.

[Second Embodiment]

Figure 7:
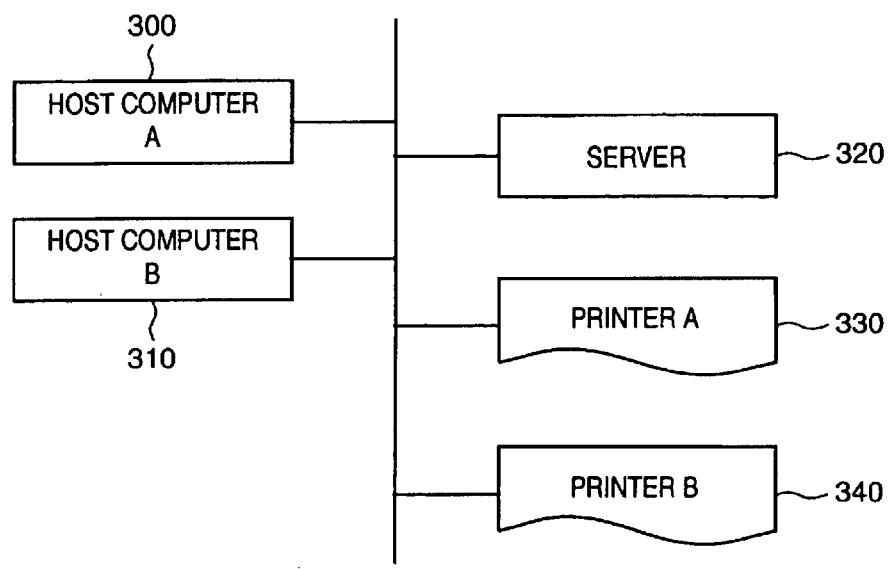
FIG. 7 shows a network system which includes host computers, a server and printers.

In the second embodiment, processing on a network built by connecting a plurality of host computers, a plurality of printers, and a server for managing these printers to a communication line 300, as shown in FIG. 7, will be explained.

Note that the arrangement of each host computer is the same as that of the host computer 100 shown in FIG. 2, and the arrangement of the printer is the same as that of the printer 200.

The processing flow will be described below taking as an example a case wherein a host computer A-300 instructs a job for printing from a printer A-330.

Basically, the processing flow is the same as that in the first embodiment.

The input operation step S1 of printing with respect to, e.g., an application program is done first, and the first normal image processing step S2, first calibration step S3, second calibration processing step S4, and second normal image processing step S5 are executed in turn.

In the second embodiment, the difference from the first embodiment is that print instructions from a plurality of host computers are queued and managed by the server 320.

Also, the server 320 intervenes in communications between the host computer and printer done in the processing shown in FIGS. 1 3, and 4.

With this arrangement, a single printer can be prevented from simultaneously receiving print instructions or inquiries from a plurality of host computers.

On the network shown in FIG. 7, the server 320 can be prevented from being temporarily overloaded when the individual host computers acquire correction data for calibration from the printers in accordance with print instructions, in the system of this embodiment.

As a method of always performing color correction in accordance with the printer state, a method of transmitting new correction data to the host computers via the server every time the printer executes calibration and generates new correction data may be used.

According to this method, the host computer need not acquire correction data from the printer in each printing. However, when the printer executes calibration and generates new correction data, the server must immediately send the new correction data to the host computer. When the server cannot communicate with a certain host computer, it must access that host computer repetitively. Therefore, when a large number of host computers are connected to the network, the server is overloaded. As a result, such loads may adversely affect other processing operations such as printing.

However, according to this embodiment, even when the printer executes calibration in this way, the server can be prevented from being overloaded.

On the other hand, the communication processes shown in FIGS. 3 and 4 can be done within a short period of time using a communication line at present. Hence, an increase in printing time due to communications is not so large as to impair operability.

Also, according to this embodiment, stability of the system on the network and good color reproducibility can be assured.

Figure 8:
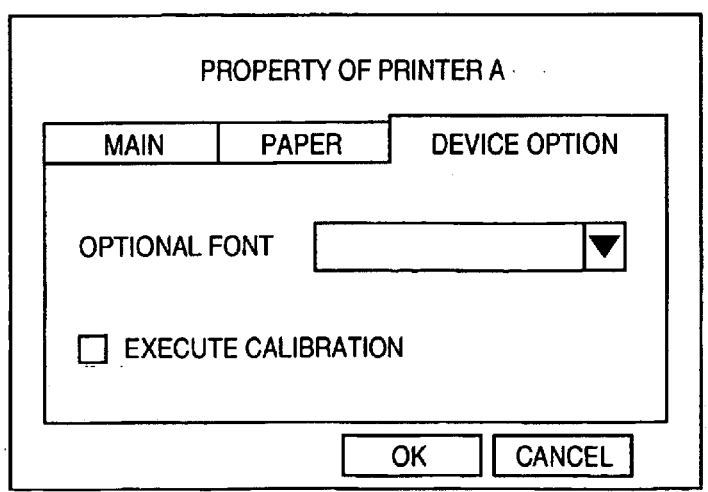
FIG. 8 is a window on which a user manually selects whether or not calibration is to be done.

Note that some user applications may place an importance not on color reproducibility but on a decrease in processing time. In such case, as shown in FIG. 8, whether or not calibration is to be done, i.e., the first and second calibration processing steps are to be executed may be manually selected on a user interface corresponding to the printer.

[Third Embodiment]

In the second embodiment, the correction data is managed on the printer side. By contrast, in the third embodiment, the server simultaneously manages correction data.

This embodiment assumes the network system shown in FIG. 7 as in the second embodiment. In this embodiment, the difference from the second embodiment is that the server communicates with the printers and simultaneously manages the latest correction data of the printers.

As has been described in the first embodiment, a controller issues a calibration execution command to an engine unit in response to a calibration request from the engine unit. The controller generates new correction data by executing processing shown in FIG. 5, and stores the data in a storage unit 203. At the same time, the controller informs the server of a generation message of the new correction data, the new correction data itself, the new correction data acquisition time, and the current status information. Upon receiving such information, the server stores the received information in correspondence with the printer, as shown in FIG. 9.

In FIG. 9, "printer name" is the name of each printer connected to the network. STATUS information is a representative value among status parameters, which serves as a threshold value when the engine unit issues a calibration request. In FIG. 9, the number of printed sheets that allows easy estimation of the correction data generation timing is used as the STATUS information. The server can estimate the number of sheets to be printed in each print job by analyzing the print instruction contents. Hence, the server calculates the number of printed sheets by summing up the estimated numbers of printed sheets.

Note that the type of representative value may be altered depending on the print method (electrophotographic method, ink-jet method) and the like of the printer. When the representative value cannot be estimated unlike the number of printed sheets, information can be acquired by periodical communications with the printers.

When a host computer issues a print instruction, the processing shown in FIGS. 3 and 4 is executed between the host computer and server.

Since the server simultaneously manages the latest correction data of the printers, a status list of the printers connected to the network system can be displayed on a print-related user interface of each host computer, as shown in FIG. 10.

This list is displayed only when the user instructs a list display on the user interface. According to this instruction, the host computer communicates with the server to acquire information required for the list display. In case of the list display shown in FIG. 10, the host computer acquires the printer name, correction data generation time, and STATUS information shown in FIG. 9 from the server. As shown in FIG. 10, the host computer then displays the acquired information in a list. In FIG. 10, the number of sheets until the engine will issue a calibration request is calculated and displayed on the basis of the number of sheets acquired from the server.

When the user instructs a calibration request on the user interface shown in FIG. 10, the host computer can issue a calibration request to the controller of each printer. When many print instructions for the printer have been queued in server, the calibration request is added to the end of the print instruction queue. More specifically, the calibration request from the host computer is sent to the controller as soon as printing operations based on the queued print instructions are complete, and correction data is generated.

In this way, correction data can be generated according to the user's request without influencing the color reproducibility of print instructions currently queued in the server.

According to this embodiment, since the server simultaneously manages the latest correction data and STATUS information, a status list of the printers can be easily presented to the user. The user can select the printer on the basis of the displayed printer status.

[Fourth Embodiment]

The present invention can be applied to various other computer systems such as a peer-to-peer computer system in addition to a computer system connected via a network shown in FIG. 2.

Also, the sequence shown in FIGS. 3 and 4 is stored as a program in a storage medium such as an FD (floppy disk), CD-ROM, ROM, magnetic tape, or the like, and the host computer can load such program via the storage medium reader 108.

Note that the present invention may be applied to either a system constituted by a plurality of equipments, or an apparatus consisting of a single equipment.

In this case, the storage medium which stores the program according to the present invention constitutes the present invention. By loading that program from the storage medium into the system or apparatus, the system or apparatus operates according to a predetermined method.

Formation of the correction table (FIG. 4) may be done by the controller unit 202 in the printer 200, and may be stored and registered in the storage unit 202 controlled by the unit 202. In this case, CMYK print data received from the host computer are corrected using the registered table in the printer before they are mapped as binary images. That is, steps S200 in FIG. 4 to S5 are executed on the printer side.

As described above, according to the present invention, even when the host sends binary image data to the printer to make the printer print, the image densities and colors can be corrected. For this reason, a high-quality image can be printed out irrespective of the state of the printer.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus comprising:

a communicator for performing two-way communications, via a communication line, with an image output unit that includes an update unit for updating condition information indicating a condition of the image output unit and a memory for storing the condition information, wherein the condition information is obtained by forming color patches and measuring colors on the color patches;

an input unit for inputting an image output instruction to be communicated to the image output unit via the communication line;

an acquisition unit for acquiring the updated condition information stored in the memory of the image output unit by utilizing said communicator to provide two-way communication, in response to the image output instruction from said input unit; and an image processor for performing a color conversion process on image data and a calibration process on the converted image data having a bit length, in accordance with the condition information acquired by said acquisition unit, wherein said image processor decreases the bit length of the calibrated image data processed by said image processor in accordance with the condition information and then outputs the bit-length-decreased image data to the image output unit via the communication line.

2. The apparatus according to claim 1, wherein the image output unit further includes:

an engine unit; and a condition acquisition unit for automatically acquiring the condition information in accordance with a change in status of the engine unit, wherein the acquired condition information is stored in the memory of the image output unit.

3. The apparatus according to claim 1, wherein the condition information is a measurement result of a plurality of patches outputted by the image output unit.

4. The apparatus according to claim 1, wherein said image processor converts image data into multi-valued data corresponding to a type of a recording medium used in the image output unit, and performs calibration processing in accordance with the condition information.

5. The apparatus according to claim 1, further comprising:
a user interface for setting whether or not the image processing is to be done in accordance with the condition information.

6. An image processing apparatus connected, via a communication network, with a host computer and a plurality of image output units, each image output unit adapted to perform a function of updating condition information of the image output unit, the condition information being obtained by forming color patches and measuring colors on the color patches, said apparatus comprising:
an input unit for inputting the condition information updated by the plurality of image output units;
a memory for storing the inputted condition information in association with each of the plurality of image output units;
a transmitter for transmitting the stored updated condition information to the host computer in accordance with a request for acquiring the condition information issued by the host computer; and
a management unit for managing an image output job of the host computer,
wherein the condition information is obtained by forming color patches and measuring colors on the color patches,
wherein the host computer performs a color conversion process on image data and a calibration process on the converted image data, having a bit length in accordance with the condition information transmitted by said transmitter,
wherein the host computer decreases the bit length of the calibrated image data processed in accordance with the condition information and then outputs the bit-length-decreased image data to the image output unit via a communication line, and
wherein each of the plurality of image output units outputs an image based on the image data processed by the host computer.

7. The apparatus according to claim 6, further comprising a second management unit for managing an image output job for an image output unit.

8. The apparatus according to claim 6, wherein each of the plurality of image output units comprises:
an engine unit;
a condition acquisition unit for automatically acquiring the condition information in accordance with a change in status of the engine unit; and
a memory for storing the acquired condition information.

9. The apparatus according to claim 6, further comprising:
a user interface for setting whether or not image processing is to be done in accordance with the condition information.

10. An image processing method for performing image processing in a network system to which an image output apparatus, a server, and a network terminal are connected, said method comprising:
in the image output apparatus:
a condition measurement step, of updating condition information by forming color patches and measuring colors on the color patches; and
a notification step, of notifying the server of the updated condition information,
in the server:
a storage step, of storing the updated condition information from the image output apparatus in accordance with notification from the image output apparatus in correspondence with a type of the image output apparatus; and
a management step, of managing an image output job, and in the network terminal:
an input step, of inputting an image output instruction of a user;
an acquisition step, of acquiring the updated condition information stored in the server in response to the image output instruction; and
a conversion and calibration processing step, of performing a color conversion process on image data and a calibration process on the converted image data, having a bit length, using an calibration processing condition in accordance with the updated condition information,
wherein said conversion and calibration processing step decreases the bit length of the calibrated image data processed in accordance with the condition information and then outputs the bit-length-decreased image data to the image output unit via a communication line.

11. An image processing method performed in a server connected, via a communication network, with a host computer and a plurality of image output units, each image output unit adapted to perform a function of updating condition information indicating a condition of the image output unit, said method comprising:
an input step, of inputting an image output instruction;
an acquisition step, of acquiring the updated condition information stored in the image output unit by utilizing two-way communications, in response to the image output instruction; and
a conversion and calibration processing step, of performing a color conversion process on image data and a calibration process on the converted image data, having a bit length in accordance with the condition information acquired in said acquisition step,
wherein said conversion and calibration processing step decreases the bit length of the calibrated image data processed in accordance with the condition information and then outputs the bit-length-decreased image data to the image output unit via a communication line.

12. An image processing method performed in a server connected, via a communication network, with a host computer and a plurality of image output units, each image output unit adapted to perform a function of updating condition information of the image output unit, said method comprising:
an input step, of inputting the condition information updated by the plurality of image output units;
a storage step, of storing the inputted condition information in association with each of the plurality of image output units;
a transmission step, of transmitting the stored updated condition information to the host computer in accordance with a request for acquiring the condition information issued by the host computer; and a management step, of managing an image output job of the host computer, wherein the condition information is obtained by forming color patches and measuring colors on the color patches, wherein the host computer performs a color conversion process on image data and a calibration process on the converted image data, having a bit length, in accordance with the condition information transmitted in said transmission step, wherein the host computer decreases the bit length of calibrated image data processed in accordance with the condition information and then outputs the bit-length-decreased image data to the image output unit via a communication line, and wherein each of the plurality of image output units outputs an image based on the image data processed by the host computer.

13. A computer-readable storage medium that stores a program for implementing, by a computer, an image processing method, the program comprising:

code for a communication step, of performing two-way communications, via a communication line, with an image output unit that includes an update unit for updating condition information indicating a condition of the image output unit and a memory for storing the condition information, wherein the condition information is obtained by forming color patches and measuring colors on the color patches;

code for an input step, of inputting an image output instruction;

code for an acquisition step, of acquiring the updated condition information stored in the image output unit by utilizing the two-way communications, in response to the image output instruction; and code for a conversion and calibration processing step, of performing color conversion on image data and calibrating the converted image data having a bit length, in accordance with the condition information acquired by the acquisition step, wherein the bit length of the calibrated image data, processed in accordance with the condition information, is decreased and then the bit-length-decreased image data is outputted to the image output unit via communication line.

14. A computer-readable storage medium that stores a program for an image processing method performed by a server connected, via a communication network, with a host computer and a plurality of image output units, each image output unit adapted to perform a function of updating condition information of the image output unit, the program comprising:

code for an input step, of inputting the condition information updated by the plurality of image output units;

code for a storage step, of storing the inputted condition information in association with each of the plurality of image output units;

code for a transmission step, of transmitting the stored updated condition information to the host computer in accordance with a request for acquiring the condition information issued by the host computer; and code for a management step, of managing an image output job of the host computer, wherein the condition information is obtained by forming color patches and measuring colors on the color patches, wherein the host computer performs a color conversion process on image data and a calibration process on the converted image data, having a bit length, in accordance with the condition information transmitted by the transmission step, wherein the host computer decreases the bit length of calibrated image data processed in accordance with the condition information and then outputs the bit-length-decreased image data to the image output unit via the communication line, and wherein each of the plurality of image output units outputs an image based on the image data processed by the host computer.

15. An image processing system for performing image processing comprising:

means for managing an image output job;

means for communicating with an image output unit;

means for updating condition information indicating a condition of the image output unit, wherein the condition information is obtained by forming color patched and measuring colors on the color patches, and the image output unit transmits a notification that the condition information has been updated together with the updated condition information, means for storing the updated condition information in accordance with the notification;

means for inputting an image output instruction from a user; and means for performing a color conversion on image data and calibrating the converted image data, having a bit length, using a calibration processing condition in accordance with the updated condition information in response to the image output instruction from the user, wherein the bit length of the calibrated image data, processed in accordance with the condition information, is decreased and then the bit-length-decreased image data is outputted to the image output unit.

16. An image processing method comprising:

a communication step, of performing two-way communications, via a communication line, with an image output unit, the image output unit includes an update unit for updating condition information indicating a condition of the image output unit and a memory for storing the condition information, wherein the condition information is obtained by forming color patches and measuring colors on the color patches;

an input step, of inputting an image output instruction to be communicated to the image output unit via the communication line;

an acquisition step, of acquiring the updated condition information stored in the memory of the image output unit by utilizing the two-way communications, in response to the image output instruction inputted in said input step; and a conversion and calibration process step, of performing a color conversion process on image data and calibrating the converted image data, having a bit length, in accordance with the condition information acquired in said acquisition step, wherein the bit length of the calibrated image data, processed in accordance with the condition information, is decreased and then the bit-length-decreased image data is outputted to the image output unit via the communication line.

17. The method according to claim 16, wherein the image output unit further includes:

an engine unit, and the method further includes a condition acquisition step, of automatically acquiring the condition information in accordance with a change in status of the engine unit, wherein the acquired condition information is stored in the memory of the image output unit.

18. The method according to claim 16, wherein the condition information is a measurement result of a plurality of patches outputted by the image output unit.

19. The method according to claim 16, wherein said conversion and calibration process step includes converting image data into multi-valued data corresponding to a type of a recording medium used in the image output unit, and performing calibration processing in accordance with the condition information.

20. The method according to claim 16, further comprising:

a set step, of setting whether or not the image processing is to be done in accordance with the condition information.

* * * * *

UNITED STATES PATENT AND TRADEMARK OFFICE
CERTIFICATE OF CORRECTION

PATENT NO. : 7,099,025 B2
APPLICATION NO. : 09/033585
DATED : August 29, 2006
INVENTOR(S) : Takeyuki Nagashima It is certified that error appears in the above-identified patent and that said Letters Patent is hereby corrected as shown below:

COLUMN 2:
Line 14, "comprises" should read -- comprises: --; and
Line 17, "apparatus" should read -- apparatus; --.

COLUMN 3:
Line 51, "and" should be deleted;
Line 52, "printer." should read -- printer; --;
Line 54, "printers." should read -- printers; --;
Line 56, "done." should read -- done; --; and
Line 59, "printer." should read -- printer; and --.

COLUMN 8:
Line 15, "if" should read -- that --.

COLUMN 9:
Line 9, "if" should read -- whether --.

COLUMN 10:
Line 15, "FIGS. 1" should read -- FIGS 1, --.

COLUMN 13:
Line 37, "length" should read -- length, --.

COLUMN 14:
Line 14, "in" should read -- ¶ in --;
Lines 20 and 42, "calibration" should read -- a calibration --;
Line 23, "an" should read -- a --;
Line 45, "length" should read -- length, --; and
Line 49, "information" should read -- information, --.

COLUMN 15:
Line 12, "calibrated" should read -- the calibrated --; and
Line 45, "communication" should read -- the communication --.

COLUMN 16:
Line 7, "calibrated" should read -- the calibrated --;
Line 9, "the" should read -- a --;
Line 20, "patched" should read -- patches --; and
Line 24, "information," should read -- information; --.

UNITED STATES PATENT AND TRADEMARK OFFICE
CERTIFICATE OF CORRECTION

PATENT NO. : 7,099,025 B2
APPLICATION NO. : 09/033585
DATED : August 29, 2006
INVENTOR(S) : Takeyuki Nagashima It is certified that error appears in the above-identified patent and that said Letters Patent is hereby corrected as shown below:

<u>COLUMN 17</u>:
Line 3, "unit," should read -- unit; --.

Signed and Sealed this

Seventeenth Day of April, 2007

JON W. DUDAS
*Director of the United States Patent and Trademark Office*